United States Patent
Dinger

(10) Patent No.: US 9,541,157 B2
(45) Date of Patent: Jan. 10, 2017

(54) TORSIONAL VIBRATION DAMPER

(71) Applicant: Schaeffler Technologies AG & Co. KG, Herzogenaurach (DE)

(72) Inventor: Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 246 days.

(21) Appl. No.: 14/059,824

(22) Filed: Oct. 22, 2013

(65) Prior Publication Data

US 2014/0041479 A1    Feb. 13, 2014

Related U.S. Application Data

(63) Continuation of application No. PCT/DE2012/000374, filed on Apr. 10, 2012.

(30) Foreign Application Priority Data

Apr. 26, 2011    (DE) .......................... 10 2011 018 594

(51) Int. Cl.
    *F16F 15/14*    (2006.01)
    *F16F 15/123*    (2006.01)

(52) U.S. Cl.
    CPC ..... *F16F 15/1428* (2013.01); *F16F 15/12353* (2013.01); *F16F 15/145* (2013.01); *Y10T 74/2131* (2015.01)

(58) Field of Classification Search
    CPC ............... Y10T 74/2131; F16F 15/1428; F16F 15/12353
    USPC ........................... 74/574.4; 60/435; 464/64.1
    See application file for complete search history.

(56) References Cited

U.S. PATENT DOCUMENTS

| 2,913,925 A | * | 11/1959 | Smirl | F16F 15/129 416/180 |
| 3,800,931 A | * | 4/1974 | Maucher | F16D 13/644 192/213.11 |
| 4,020,937 A | * | 5/1977 | Winter | F16D 13/71 192/107 R |

(Continued)

FOREIGN PATENT DOCUMENTS

| CN | 1955502 A | 5/2007 | | |
| DE | 4003076 A1 | * | 8/1991 | ........... F16D 23/025 |

(Continued)

OTHER PUBLICATIONS

English Abstract of DE 10 2011 084 641 A1. Christian Dinger, Apr. 2012.*

(Continued)

*Primary Examiner* — Vinh Luong
(74) *Attorney, Agent, or Firm* — Simpson & Simpson, PLLC

(57) ABSTRACT

A torsional vibration damper for transferring torque between a first and a second rotatable element, having a rotatable pressure plate to transfer the torque from the first element, a rotatable output element to transfer the torque to the second element, and a vibration damper element to transfer the torque between the pressure plate and the output element, where the vibration damper element includes an energy-storing spring system. A driving element is formed in a single piece on the pressure plate to fit against the spring system.

9 Claims, 3 Drawing Sheets

(56) References Cited

U.S. PATENT DOCUMENTS

| | | | | |
|---|---|---|---|---|
| 4,586,596 | A * | 5/1986 | Schmid | F16F 15/129 |
| | | | | 192/213.31 |
| 6,409,605 | B1 * | 6/2002 | Hemeryck | F16F 15/1238 |
| | | | | 192/213.2 |
| 7,134,537 | B2 * | 11/2006 | Schwuger | F16D 23/025 |
| | | | | 192/53.34 |
| 8,561,499 | B1 * | 10/2013 | Schiemann | F16F 15/30 |
| | | | | 188/378 |
| 2010/0133063 | A1 * | 6/2010 | Degler | F16F 15/12366 |
| | | | | 192/30 V |
| 2011/0099992 | A1 * | 5/2011 | Magerkurth | F16F 15/145 |
| | | | | 60/435 |
| 2011/0201433 | A1 * | 8/2011 | Schnaedelbach | F16F 15/1232 |
| | | | | 464/64.1 |
| 2012/0180473 | A1 * | 7/2012 | Huegel | F16F 15/12373 |
| | | | | 60/435 |
| 2012/0325609 | A1 * | 12/2012 | Huegel | F16F 15/145 |
| | | | | 192/3.21 |
| 2016/0146324 | A1 * | 5/2016 | Lindemann | F16H 45/02 |
| | | | | 192/3.28 |

FOREIGN PATENT DOCUMENTS

| | | |
|---|---|---|
| DE | 102008057647 A1 | 6/2009 |
| DE | 102008057648 A1 | 6/2009 |
| DE | 102009024217 A1 | 12/2009 |
| DE | 102009024743 A1 | 1/2010 |
| DE | 102010035124 A1 | 3/2011 |
| DE | 10 2011 084 641 A1 * | 4/2012 ......... F16F 15/1428 |
| EP | 1744074 A2 | 1/2007 |
| JP | H07208547 A | 8/1995 |

OTHER PUBLICATIONS

EPO Machine Translation of EP1744074 (A2), Uwe et al., Jan. 2007.*
EPO Machine Translation of DE4003076 (A1), Alfred et al., Aug. 1991.*
Define having, googlesearch.com., Aug. 29, 2016.*
CN Office Action dated Sep. 23, 2014.

* cited by examiner

TORSIONAL VIBRATION DAMPER

CROSS-REFERENCE TO RELATED APPLICATIONS

This patent is filed under 35 U.S.C. §120 and §365(c) as a continuation of International Patent Application No. PCT/DE2012/000374 filed Apr. 10, 2012, which application claims priority from German Patent Application No. 10 2011 018 594.1 filed Apr. 26, 2011, which applications are incorporated herein by reference in their entireties.

FIELD OF THE INVENTION

The invention relates to a torsional vibration damper, having a vibration damper element to transfer torque between a first and a second rotatable element.

BACKGROUND OF THE INVENTION

A torsional vibration damper is utilized, for example, in a motor vehicle, so as to transfer torque between a drive motor and a gear unit or a drivetrain. In this case, the torsional vibration damper includes one or more elements for decoupling torsional vibrations between the drive motor and the gear unit. Torsional vibrations can be caused, for example, on the part of the drive motor, when the drive motor is a reciprocating engine whose torque output runs non-uniformly over an angle of rotation of the output shaft.

A customary arrangement of a torsional vibration damper includes a compression spring or bow spring, which is situated in the region of a circumference around an axis of rotation such that it is able to temporarily store and re-emit energy depending on the torque input into the torsional vibration damper. The torque of the drive motor is transferred through a friction-disk clutch to a saucer-shaped metal plate, which is connected by means of claw gearing to a second saucer-shaped metal plate, which is engaged with one end of the spring. The other end of the spring acts on an intermediate flange, which is connected to a hub through which the torque can be delivered to the transmission.

The claw gearing between the two saucer-shaped metal plates usually has free play, so that while idling, for example, when the torsional vibration damper is being moved but is transferring practically no torque, rattling noises can develop which may be perceived as unpleasant. Furthermore, imprecise centering of the second saucer-shaped metal plate can give rise to imbalance of the torsional vibration damper, which can likewise result in annoying noise. The object of the invention is therefore to specify a torsional vibration damper that overcomes the named disadvantages.

BRIEF SUMMARY OF THE INVENTION

A torsional vibration damper for transferring torque between a first and a second rotatable element including a rotatable pressure plate to transfer the torque from the first element, a rotatable output element to transfer the torque to the second element, and a vibration damper element to transfer the torque between the pressure plate and the output element. At the same time, the vibration damper element includes an energy-storing spring system, and a driving element to be fitted to the spring system is formed in a single piece on the pressure plate.

That makes it possible to dispense with a separate element which produces the torque flow between the pressure plate and the spring system. In that way, rattling sounds that are caused by a non-play-free engagement between this element and the pressure plate can be avoided. Any imbalance which may be caused by potentially imprecise fabrication or installation of this transmission element can also be avoided. Avoiding power transfer with free play can also increase the fatigue strength of the torsional vibration damper. The saving of this component can also result in cost advantages in fabrication and maintenance. Moreover, the torsional vibration damper according to the invention makes it possible to increase a diameter and/or a radial interval between the spring system and the axis of rotation of the pressure plate, where torsional vibrations can be better isolated between the pressure plate and the output element.

The pressure plate can have an axial frictional surface in order to transfer the torque from the first element by means of frictional engagement. As a result, the torsional vibration damper can include part of a friction-disk clutch, which serves to selectively sever the transmission of the torque between the first and the second element.

The spring system can be situated in a radially outer region of the pressure plate, while the vibration damper element includes a centrifugal force pendulum that is placed axially in the region between the frictional surface and the spring system. Additional isolation of torsional vibrations between the first and the second rotatable element can be achieved through the use of the centrifugal force pendulum. The construction space available for the centrifugal force pendulum can be enlarged, so that the mass and/or form of the centrifugal force pendulum can be more readily adaptable to the requirements.

In an embodiment, the driving element includes a strap which extends inward in a radial direction. The strap can be easily made, and can result in advantages in installing the centrifugal force pendulum.

The centrifugal force pendulum can include a pendulum flange with a movably attached pendulum mass, while the pendulum flange has a radial cutout so as to enable an axial convergency of the pendulum flange to the pressure plate, past the strap. This enables the pendulum flange with the pendulum mass to be brought in an axial direction into the space between the inward-extending strap and the pressure plate when installing the torsional vibration damper. This can simplify the installation of the torsional vibration damper, without having to rework the strap after assembly.

In another embodiment, the vibrational element includes a plurality of spring systems which are distributed around a circumference of the pressure plate, with one driving element of the pressure plate being assigned to each spring system. The forces, which develop between the pressure plate and the output element, can thus be distributed around the circumference of the pressure plate.

The pressure plate is manufactured from a metal sheet, for example, enabling the pressure plate to be produced cost-effectively as a pressed or deep-drawn part.

The pressure plate can have an encircling rim, which extends in an axial direction, enabling the stability of the pressure plate to be increased at different speeds of rotation, and at the same time possibly enlarging the construction space needed for the spring system and/or the centrifugal force pendulum.

In yet another embodiment, the output element includes a hub which is set up to be moved axially on an output shaft while ending torque. This enables the entire torsional vibration damper to be moved in an axial direction to produce or sever the frictional engagement with the pressure plate.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
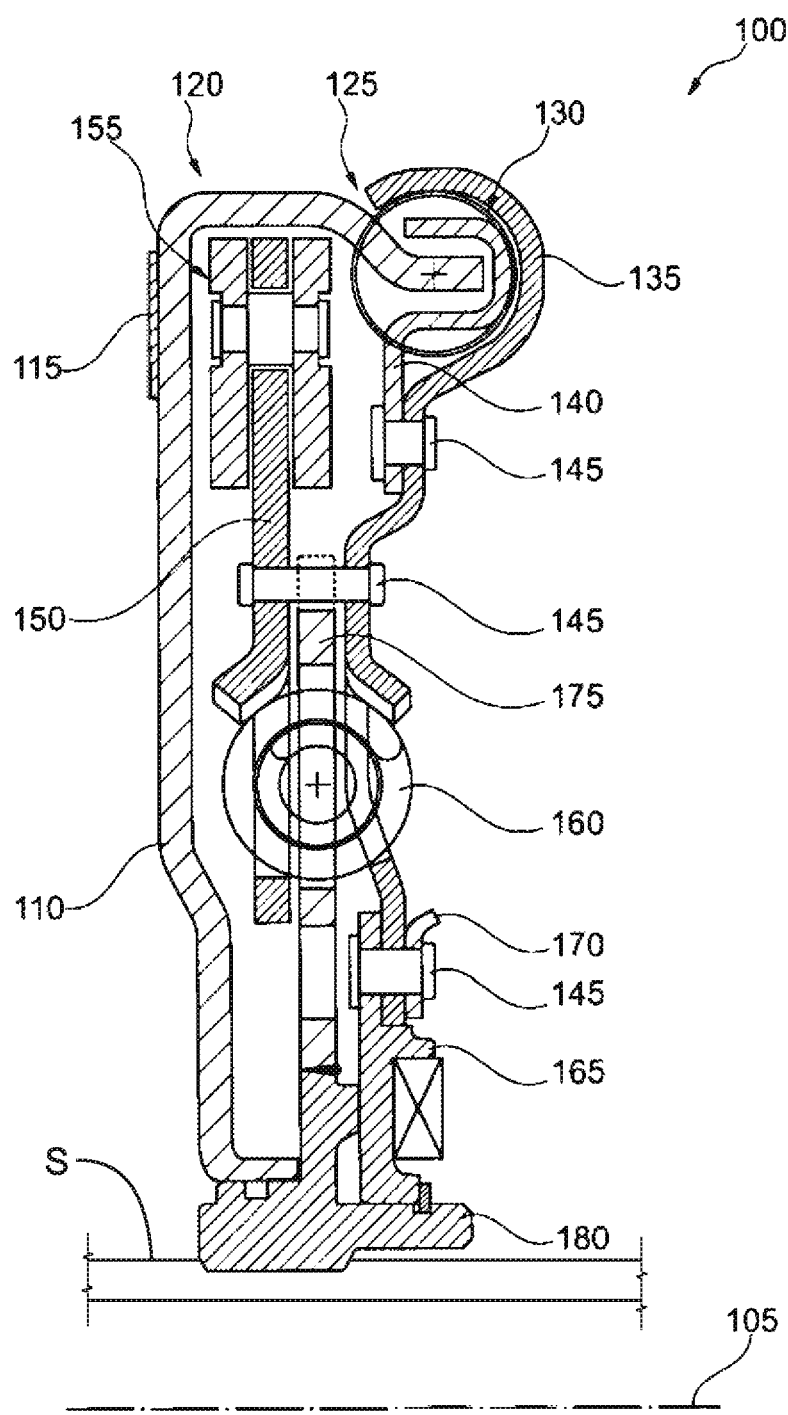
FIG. 1 is a sectional view through part of a torsional vibration damper.

FIG. 1 shows the upper half of a longitudinal section through torsional vibration damper 100. Essentially, only the cross sections are shown; encircling edges beyond the sectional plane are not visible.

Torsional vibration damper 100 is set up to rotate around axis of rotation 105. Torque is transferred along axis of rotation 105 generally in both directions. A preferred direction of transmission runs from left to right, for example, from a drive motor of a motor vehicle to a transmission of the motor vehicle.

Pressure plate 110 carries friction lining 115 on its left face in a radially outer region. The torque to be transferred can be introduced into torsional vibration damper 100, for example, by means of a flywheel (not shown) that can rotate around axis of rotation 105. The flywheel is pressed axially against friction lining 115. In other embodiments, friction lining 115 can also be fastened to the flywheel, in which case the frictional engagement can be produced by means of axial pressure between friction lining 115 and pressure plate 110. The friction-disk clutch set up by the flywheel, friction lining 115 and pressure plate 110 may be a dry clutch or a wet clutch running in an oil bath. There may also be a plurality of plates with friction linings 115 and/or a plurality of steel plates contained in the clutch.

In yet another embodiment, instead of friction lining 115 the torque may also be coupled and uncoupled by means of a plate carrier, which is placed on the left face of pressure plate 110. The plate carrier is part of a clutch, for example, a multi-plate lamellar clutch, which optionally runs dry or in a fluid bath. In this constellation, an outer zone of pressure plate 110 is subjected to weaker forces, so that pressure plate 110 can be more thinly dimensioned. This enables a total mass, and, for example, a rotating mass of pressure plate 110 or of torsional vibration damper 100 to be reduced.

In the region of pressure plate 110 that is the furthest away from axis of rotation 105, pressure plate 110 extends in the axial direction to the right and forms encircling collar 120. Strap 125 extends out from collar 120 in a first section axially to the right and radially inward, and then runs out in a second section that runs parallel to axis of rotation 105. Strap 125 is limited in its width to a small part around a circumference of pressure plate 110 and axis of rotation 105, and does not extend around the entire circumference.

Strap 125 fits against one end of outer bow spring 130, perpendicular to the drawing direction. Bow spring 130 extends along another circumference around axis of rotation 105. In other embodiments, instead of outer bow spring 130 a compression spring may also be used, which extends in a straight direction tangential to the circumference around axis of rotation 105. Outer bow spring 130 can be varied in a usual manner, for example, through parallel or serial arrangement of a plurality of spring elements, which, for example, have different spring properties.

In an embodiment, outer bow spring 130 is supported in the axial direction toward the right, and, for example, in the radial direction toward the outside, by holding plate 135 ("retainer").

The opposite end of outer bow spring 130 fits against meshing element 140, which is fastened rigidly to holding plate 135 by means of riveted connection 145. This causes holding plate 135 to be rotatable counter to pressure plate 110 around axis of rotation 105, while outer bow spring 130 is compressed. During the transfer of torque by torsional vibration damper 100, torsional vibrations are isolated or canceled by this compression and a corresponding decompression.

By means of another riveted connection 145, holding plate 135 is connected in an axial direction to pendulum flange 150. Pendulum flange 150 extends radially outward from riveted connection 145, where centrifugal force pendulum 155 is attached movably to pendulum flange 155. Centrifugal force pendulum 155 is usually installed rotatably and/or slidably on pendulum flange 150 by means of a sliding block guide in such a way that it is slidable or swingable around axis of rotation 105 in and contrary to the direction of rotation of pendulum flange 150. This enables torque fluctuations that are transferred by torsional vibration damper 100 to be canceled or isolated.

Sections of holding plate 135 and of pendulum flange 150 which extend radially inward from riveted connection 145 fit against one end of inner bow spring 160. In the depicted embodiment, inner bow spring 160 includes an outer spring element and an inner spring element concentric thereto, which operate parallel to each other. The inner bow spring can be varied in a manner corresponding to outer bow spring 130, for example, also as a straight compression spring. In the radially outer region of inner bow spring 160, sections of holding plate 135 and of pendulum flange 150 are shaped so that they support inner bow spring 160 radially toward the outside. Such a support is necessary in order to counteract centrifugal forces, which drive inner bow spring 160 radially outward at high rotational speeds of torsional vibration damper 100.

Holding plate 135 continues inward in a radial direction and is fastened to flange 165 and turbine 170 by means of yet another riveted connection 145, where only a lower fastening section of turbine 170 is depicted. Depicted torsional vibration damper 100 is set up to be employed in a torque converter, in which an impeller that is connected to the flywheel acts hydrodynamically on turbine 170 as long as there is a sufficient difference in speed between the impeller and turbine 170. By engaging the friction-disk clutch that is constructed in the region of friction lining 115, the impeller can be coupled mechanically with turbine 170.

Inner flange 175 fits against a second end of inner bow spring 160. Inner bow spring 160 causes a vibration-damping transfer of force from holding plate 135 to inner flange 175. Inner flange 175 is connected to hub flange 180, for example, by means of gearing or splining. Hub flange 180 has internal toothing to transfer torque to output shaft S. For example, hub flange 180 and output shaft S are connected to each other, for example, by means of a splined. connection in such a way that a torsional connection is guaranteed, while hub flange 180 is movable in an axial direction on output shaft S. By sliding hub flange 180 on output shaft S, the frictional engagement in the area of frictional element 115 can be established or severed selectively.

The introduction of force into outer bow spring 130 by means of strap 125, which is formed in a single piece on base plate 110, results on the one hand in sufficient construction space to situate outer bow spring 130 with a large diameter and radially far outside. On the other hand, there is sufficient construction space in an area axially between outer bow spring 130 and friction lining 115 for centrifugal force pendulum 155 and pendulum flange 150.

Contrary to known torsional vibration dampers, the depicted embodiment of torsional vibration damper 100 allows inner flange 175 to be designed in a plane. Offset inner flange 175 or hub flange 180 can thus be avoided, which enables the life expectancy of inner leaf spring 160 to be increased. The torque transferred by means of outer bow spring 130 can be removed at holding plate 135, and does not have to be rerouted in a complex way as in the case of known torsional vibration dampers.

Figure 2:
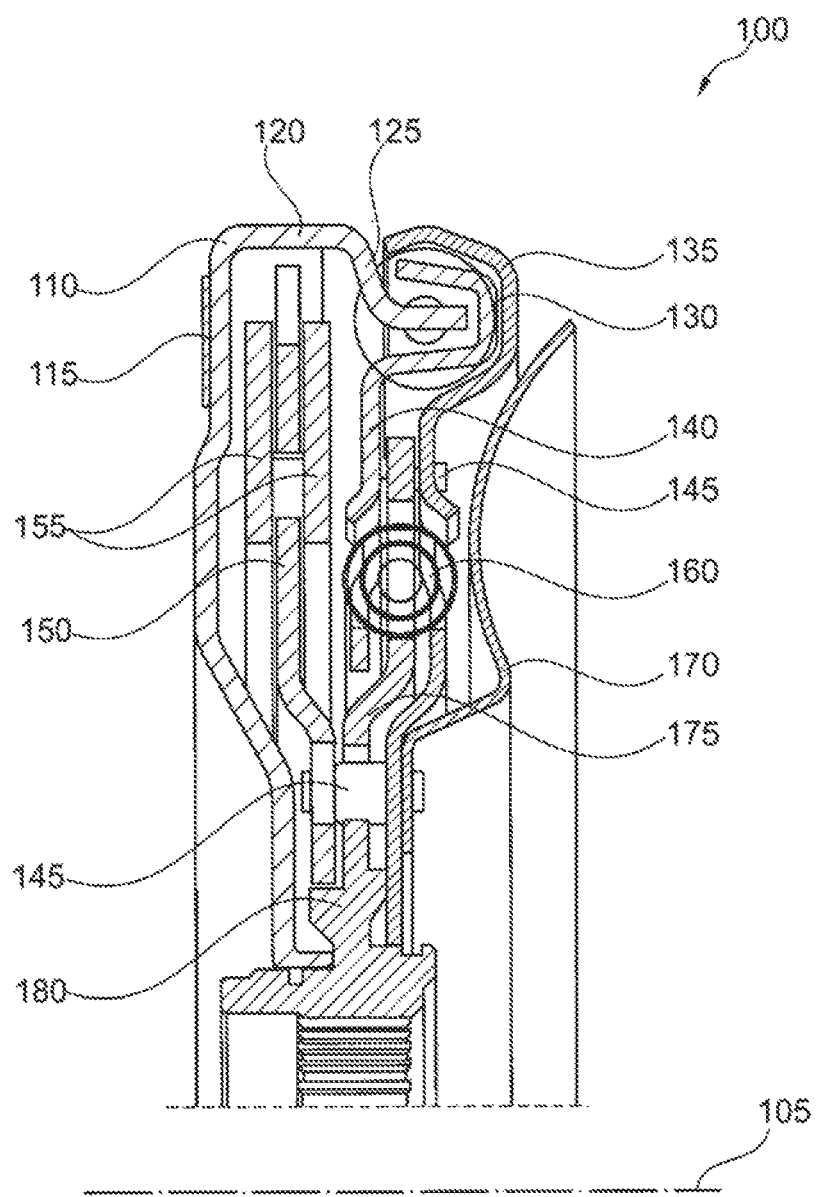
FIG. 2 is a another sectional view through part of a torsional vibration damper; and, FIG. 3 is an exploded view of part of a torsional vibration damper.

FIG. 2 shows another sectional view through part of torsional vibration damper 100 in a different embodiment. Depicted torsional vibration damper 100 corresponds in most of its design features to torsional vibration damper 100 from FIG. 1.

In torsional vibration damper 100 shown in FIG. 2 also, strap 125 of pressure plate 110 is directly engaged with outer bow spring 130. in this embodiment, the distance of outer bow spring 130 from axis of rotation 105 is somewhat smaller than in FIG. 1, so that holding plate 135 does not protrude in a radial direction over collar 120 of pressure plate 110.

In contrast to the embodiment depicted in FIG. 1, pendulum flange 150 is attached to holding plate 135 by means of only one riveted connection which is situated radially further inside. At the same time, riveted connection 145 fastens turbine 170 to holding plate 135. As an additional difference from the embodiment in FIG. 1, both pendulum flange 150 and inner flange 175 are offset in a region radially outside of riveted connection 145. Furthermore, inner flange 175 is made in a single piece with hub flange 180.

Figure 3:
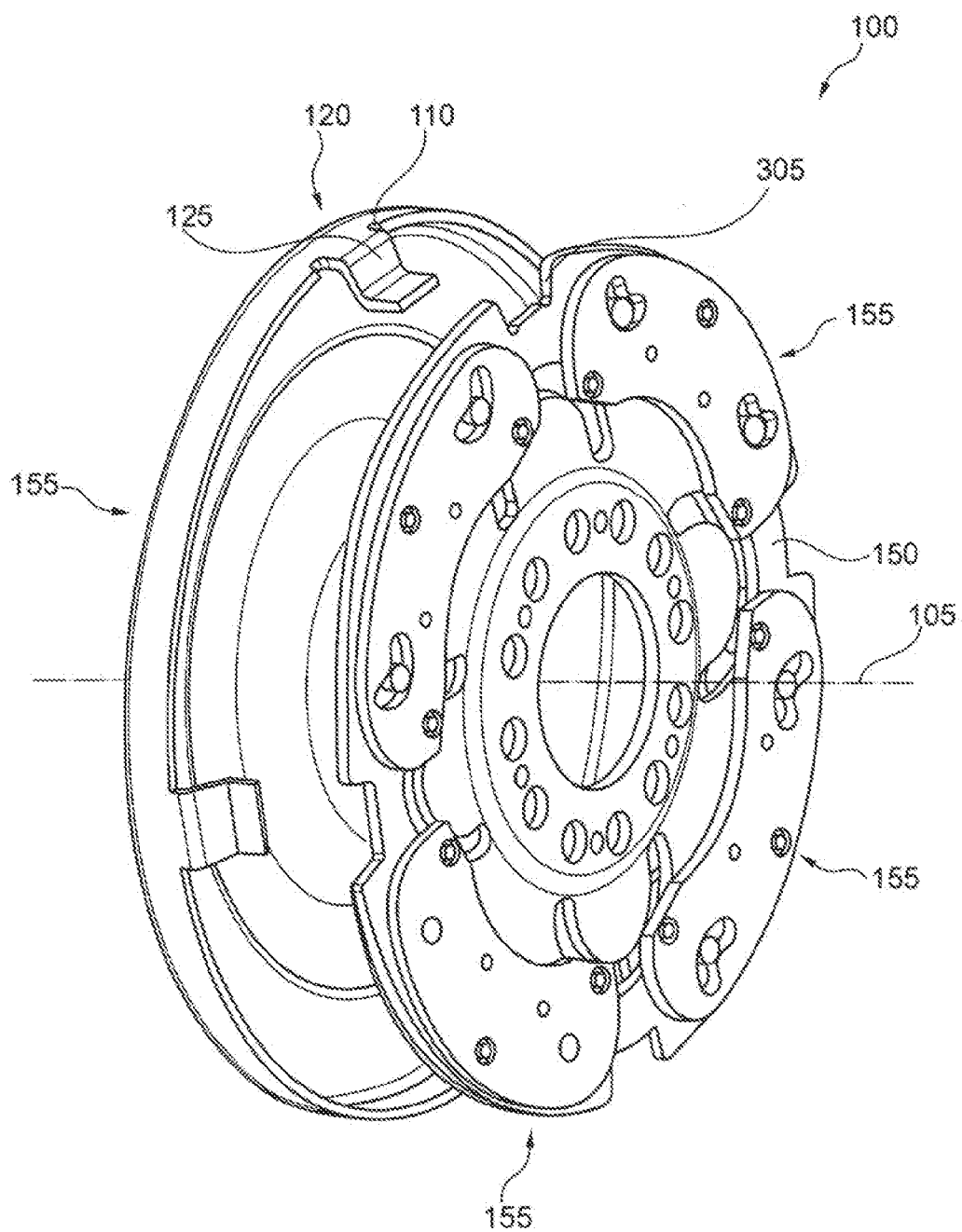

FIG. 3 shows an exploded view of part of torsional vibration damper 100 corresponding to torsional vibration dampers 100 from FIGS. 1 and 2.

It can be seen in the depiction in FIG. 3 that pendulum flange 150 carries a total of four centrifugal force pendulums 155, which are distributed around a circumference of pendulum flange 150. Between adjacent pendulum flanges 155 in each case radial cutout 305 is provided in an outer region of pendulum flange 105. Cutouts 305 correspond to straps 125 of pressure plate 110, which extend radially inward from collar 120. By virtue of cutouts 305, pendulum flange 150 can be brought past straps 125 close to the right side of pressure plate 110 in the axial direction, until pendulum flange 150 with centrifugal force pendulums 155 is located radially inside the collar, Cutouts 305 thus enable pendulum flange 150 with centrifugal force pendulums 155 to be mounted past the end sections of straps 125 on pressure plate 110. The remaining elements of torsional vibration damper 100, described above in reference to the tracks 1 and 2, are installed in a known manner.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 100 torsional vibration damper
105 axis of rotation
110 pressure plate
115 friction lining
120 collar
125 strap
130 outer bow spring
135 holding plate (retainer)
140 meshing element
145 riveted connection
150 pendulum flange
155 centrifugal force pendulum
160 inner bow spring
165 flange
170 turbine
175 inner flange
180 hub flange
305 cutout

What is claimed is:

1. A torsional vibration damper, comprising:
   a rotatable pressure plate having a strap extending from the pressure plate in an axial direction;
   a rotatable hub flange arranged to connect to an output shaft;
   a holding plate arranged to transfer torque to the rotatable hub flange;
   a spring circumferentially aligned with the strap to transfer the torque between the pressure plate and the holding plate;
   a pendulum flange located axially between the pressure plate and the spring, the pendulum flange connected to the holding plate and having a cutout;
   a plurality of centrifugal force pendulums distributed around a circumference of the pendulum flange, wherein the strap extends axially through the cutout in the pendulum flange.

2. The torsional vibration damper as recited in claim 1, wherein the pressure plate has an axial frictional surface in order to transfer the torque.

3. The torsional vibration damper as recited in claim 2, wherein the spring is situated in a radially outer region of the pressure plate.

4. The torsional vibration damper as recited in claim 1, wherein the strap extends inward in a radial direction.

5. The torsional vibration damper as recited in claim 1, wherein:
the pressure plate has a plurality of straps extending from the pressure plate in the axial direction.

6. The torsional vibration damper as recited in claim 1, wherein the pressure plate is made from a metal sheet.

7. The torsional vibration damper as recited in claim 1, wherein the pressure plate has an encircling rim which extends in the axial direction.

8. The torsional vibration damper as recited in claim 1, wherein the hub flange is set up to be moved axially on the output shaft while ending torque.

9. A torsional vibration damper, comprising:
a pressure plate having a strap extending from the pressure plate in an axial direction;
a hub flange arranged to connect to an output shaft;
a holding plate arranged to transfer torque to the rotatable hub flange;
a spring circumferentially aligned with the strap to transfer the torque between the pressure plate and the holding plate;
a pendulum flange:
  connected to the holding plate;
  located axially between the pressure plate and the holding plate; and,
  having a cutout; and,
a plurality of centrifugal force pendulums distributed around a circumference of the pendulum flange, wherein the strap extends axially through the cutout.

* * * * *